United States Patent
Moore et al.

(10) Patent No.: US 6,557,108 B1
(45) Date of Patent: Apr. 29, 2003

(54) SYSTEM AND METHOD IN A MODEM FOR PROVIDING A SHORTENED RESET PULSE UPON RECEIPT OF AN EXTERNAL RESET PULSE

(75) Inventors: David Moore, Riverton, UT (US); Harrison Killian, Kaysville, UT (US); David Arnesen, West Jordan, UT (US)

(73) Assignee: 3Com Corporation, Santa Clara, CA (US)

( * ) Notice: Subject to any disclaimer, the term of this patent is extended or adjusted under 35 U.S.C. 154(b) by 0 days.

(21) Appl. No.: 09/322,953

(22) Filed: May 28, 1999

(51) Int. Cl.$^7$ ................................................. G06F 1/04
(52) U.S. Cl. .................... 713/500; 713/1; 713/300; 713/320; 713/323; 709/200; 709/222
(58) Field of Search .......................... 713/1, 300, 320, 713/323, 500; 709/200, 222

(56) References Cited

U.S. PATENT DOCUMENTS

| | | | | |
|---|---|---|---|---|
| 4,796,211 A | * | 1/1989 | Yokouchi et al. | 364/569 |
| 5,086,505 A | * | 2/1992 | Goldberg et al. | 395/775 |
| 5,159,217 A | * | 10/1992 | Mortensen et al. | 307/597 |
| 6,356,965 B1 | * | 3/2002 | Broyles et al. | 710/104 |

* cited by examiner

Primary Examiner—Thomas Lee
Assistant Examiner—Nitin C. Patel
(74) Attorney, Agent, or Firm—Michaelson & Wallace; Peter L. Michaelson

(57) ABSTRACT

A system and method for providing a shortened DSP reset pulse to cause a modem to reset and enter a sleep mode as soon as possible after receipt of an external reset pulse issued by a host. A reset controller detects the external reset pulse, issues a separate reset pulse to the modem, monitors the modem's clock and then terminates the separate reset pulse after a prescribed duration. The prescribed duration is determined by the minimum time required by the DSP to reset. The invention is embodied in a modem connected to an external controller. The modem includes a DSP having a reset terminal and a clock. The DSP begins performing a reset upon a first signal applied to its reset terminal and causes the modem to enter a sleep-mode after a second signal is applied to its reset terminal. The external controller is capable of transmitting an external signal. The reset controller in the modem has a counter and an output node. The counter is connected to the clock and provides a counter output signal upon receipt of a predetermined number of cycles of the clock. The counter initiating generally concurrent with receipt of the external signal. The output node is connected to the reset terminal of the DSP and to the output counter. The output node provides a first signal to the DSP generally concurrent with receipt of the external signal and a second signal generally concurrent with receipt of the counter output signal.

23 Claims, 5 Drawing Sheets

SYSTEM AND METHOD IN A MODEM FOR PROVIDING A SHORTENED RESET PULSE UPON RECEIPT OF AN EXTERNAL RESET PULSE

BACKGROUND OF THE INVENTION

1. Technical Field

The invention is related to the field of modems for use with personal computers or other similar host devices.

2. Background

When a computer, portable computer, or other host device utilizing a modem is turned on or reset, it is strongly desired that the modem quickly complete its own reset and then enter a "sleep" mode as soon as possible. A sleep mode is a condition wherein the modem, or similar device, is waiting to be utilized by the host to perform its primary tasks. While waiting in a sleep mode the device uses a minimal amount of power.

A quick to reset and sleep operation is desired for a variety of reasons. Primarily, quickly obtaining a sleep mode allows for compliance with the requirements of the standard issued by the Personal Computer Memory Card International Association (PCMCIA). Specifically, the PCMCIA standard requires that the average current during the first second after power is applied to the modem not exceed a specified value. This requirement is made to protect the host from a device which would draw too much power from it. A quick reset and sleep of the modem also provides the advantage of conserving power.

Like other components of a host, the modem's reset is initiated by the host's reset pulse. The host's reset pulse is asserted soon after power has been applied to the host or when a system reset command has been made. For a host's PCMCIA system, the reset pulse, as well as all other aspects of the system, must comply with the PCMCIA standard.

PCMCIA is an international standards body and trade association consisting of over 300 companies that has developed a standard for small, credit card-sized devices called PC Cards. Initially PC Cards were primarily used to provide additional memory to the host, but now PC Cards are used in many varied applications including several types of RAM memory, pre-programmed ROM cards, modems, sound cards, floppy disk controllers, hard drives, CD ROM and SCSI controllers, Global Positioning System (GPS) cards, data acquisition, pagers and other external devices. Complying with the PCMCIA standard provides many advantages.

Although the PCMCIA standard was originally developed for adding memory to portable computers, as noted, it has been expanded over time to cover many different types of external devices. Modems are one of these types. The PCMCIA standard requires that the average current draw during the first second after start-up of the computer not exceed a specified value. To comply with this requirement, not all of the attached devices can be running during the entire duration of the start-up. Therefore, a goal in designing a PCMCIA compatible device, such as a modem, is to have the device enter a sleep mode as soon as possible after the beginning of the start-up or reset.

Similarly, it is a goal to conserve power as prescribed by the "Berlin Power Compliance". In meeting all the foregoing requirements the modem's Digital Signal Processor (DSP) needs to complete initialization and cause the modem to enter a sleep mode as soon as possible.

For modems, the problem which has existed to date is that if the modem simply uses the host's reset pulse to control its own reset, it will not reset and enter its sleep mode quickly enough. This is due to the fact that the modem's DSP will not begin the sleep operation until after the host reset pulse has finished. Although the DSP will start its initialization when the host's reset pulse is initially received, and the DSP may possibly even finish initialization prior to completion of the reset pulse, the DSP will only begin causing the modem to enter a sleep mode upon receipt of the trailing edge of a reset pulse. In other words, the time required for the modem to complete its reset and go to sleep has always been longer then the duration of the host's reset pulse.

For a PCMCIA system, the PCMCIA reset pulse is asserted by the host computer, via the PCMCIA controller, at the time of a start-up or a reset. The PCMCIA reset pulse, which instructs all attached components to perform their own resets, can vary in its duration. Under the PCMCIA standard, the PCMCIA reset pulse must be at least 10 micro-seconds long, but the pulse can potentially last several seconds. In circumstances where the PCMCIA reset pulse is long, the modem will fail to comply with the PCMCIA standard as the modem will take too long to reset and go to sleep.

A further problem with the PCMCIA reset pulse is that as a positive asserted pulse it is incompatible with the need of the internal components of most modems. Specifically, the DSP of most modems require that the reset pulse they receive be a negative asserted pulse. This problem has historically been resolved by simply inverting the PCMCIA pulse prior to it being received by the DSP. Typically, this inversion is performed by the modem's application specific integrated circuit (ASIC).

It is critical that a proper reset of the modem is carried out. If the reset is never issued at start-up, or if the pulse is so short that it is not recognized by the DSP, then the DSP will start running its code at some random location. Also, if the reset pulse is long enough to be recognized by the DSP, but not long enough to allow the DSP to finish initializing its critical registers, the DSP will fail to operate properly.

With modems, prior solutions to the problems presented by the limited current draw requirements of the PCMCIA standard have primarily involved two approaches. Each of these approaches have attempted to reach compliance with the standard by minimizing the time between the issuance of the host reset pulse and entry into a sleep mode. In the first approach no attempt was made to shorten the PCMCIA reset pulse. Instead, efforts were made to minimize the time needed by the modem to complete its reset and get to sleep after the completion of the PCMCIA pulse. The second approach however did seek to shorten the duration of the PCMCIA pulse by using additional external circuitry to modify the pulse.

The first approach attempted to make the modem comply with the PCMCIA specification by minimizing the time from completion of the PCMCIA pulse to when the modem was asleep. Because no attempt was made to shorten the length of the PCMCIA reset pulse, only the duration of the modem's initialization and entry into the sleep mode could be shortened. This was accomplished by minimizing the code used by the DSP to perform the initialization and entry into the sleep mode tasks. Further, time was saved by utilizing a faster storage apparatus in the modem. However, under this approach the overall time from start of the reset to entry into the sleep mode could never be shortened sufficiently to assure compliance with the PCMCIA specification. As such, this solution only worked when the PCMCIA reset pulse was relatively short.

The second approach consisted of adding circuitry to provide a greater chance of compliance with the PCMCIA standard. However, this approach was not very efficient, increased costs and used additional board space within the modem. Unlike the first approach, with the second approach the received PCMCIA reset pulse was modified so it had a shorter duration before it was applied to the DSP. The additional circuitry operated to issue a shortened reset pulse to the DSP, allowing a quicker completion of the modem's reset and entry into the sleep mode. The advantage of modifying the PCMCIA reset pulse was that since the duration of the pulse could be controlled, the reduction of time would not solely be a result of increasing the speed of the modem's reset/sleep operation. Because the reset pulse seen by the DSP would be substantially shorter than the PCMCIA pulse, the DSP would receive the release (trailing edge) of the pulse long before the PCMCIA reset pulse itself was released. This would allow the DSP to begin the entry into the sleep mode much sooner than if the DSP had to wait for the completion of the PCMCIA reset pulse.

The circuitry used in this approach was placed in line between the host and the rest of the modem's components. In this position, the circuitry was be able to receive the incoming PCMCIA reset pulse, modify it and send the shortened pulse on to the DSP. Upon release of the shortened reset pulse the DSP would then begin the modem reset and cause the modem to enter a sleep mode much sooner than the prior approach.

An example of the circuitry used in this approach is shown in FIG. 1. As can be seen the circuit is simply a R/C filter, that is, a resistor 2 and a capacitor 4 connected between the PCMCIA reset pulse input 6 and the ground 8. With this circuit, the PCMCIA pulse would first be transformed to a significantly shorter waveform, which would spike upwards and then over time decay as the resistor dissipated the charge stored in the capacitor, as measured at node 3 in FIG. 1 and as charted in FIG. 2. With inversion by an inverter, the circuit's output pulse waveform would become a signal which drops downward from an initial value, and then steps back up to the initial value, as shown in FIG. 1. The duration of the resulting output waveform would be directly dependent upon the resistance of provided by the resistor 2. The lower the value of the resistance, the quicker the discharge and thus the shorter the duration of the resulting output waveform. The higher the resistance, the slower the discharge and the longer the output waveform.

The shortened and inverted reset pulse would allow the modem to quickly reset and enter a sleep mode regardless of the length of the original PCMCIA reset pulse. In fact, using the external circuitry, the modem could be asleep well before a long PCMCIA reset pulse was complete.

One disadvantage to the use of additional circuitry was that it required extra hardware that raised the cost of the modem and used up valuable board space. Another problem was controlling the duration of the pulse. Because the capacitance and resistance values of the circuit directly affected the shape and length of the waveform, any variations in the values would have a direct effect on the output. The modem's DSP requires a reset pulse which is at least a certain duration in order to carry out the reset. Therefore, if a particular circuit happens to have a low resistance, causing the output waveform to be too short, the modem will fail to reset.

Because each mass-produced resistor or capacitor varies somewhat from a mean value, the resulting circuits using such elements will have a corresponding range of R/C decay times. To the extent that some of these circuits produce reset pulses which were too short, the modems they were used in would be defective. Of course this defect percentage could be lowered by increasing the mean value of the resistors used. Such an increase would result in an proportional increase in the mean duration of the circuit's output pulse. Increasing the duration of the output pulse increases the time for the modem to enter a sleep mode. With the duration of reset pulse set too long the modem would not meet the PCMCIA standard.

Thus, a device is sought which will cause the modem to reset itself and enter a sleep mode as quickly as possible after the host has issued a reset pulse. The modem must quickly reset and sleep even if the duration of the host's reset pulse is relatively long. The device must be relatively inexpensive, use only the modem's existing hardware and not take up any a additional board space. The device must be capable of receiving the host's reset pulse and issuing a separate shortened reset pulse to the rest of the modem. But in so doing, the device must not modify or alter the host's reset pulse. That is, the host and any of the other components attached to the host, must continue to see an unaltered host reset pulse. Further, the waveform or duration of the reset pulse asserted by the device to the rest of the modem must not be susceptible to variations in component values. To minimize the overall time to reset and sleep, the reset pulse asserted by the device must be as close as possible to the minimum required by the DSP.

SUMMARY OF THE INVENTION

The present invention is a system and method in a modem for providing a shortened DSP reset pulse upon receipt of an external reset pulse. The system includes a reset controller which operates to cause the modem to complete its reset as soon as possible after an external reset pulse is asserted by the host. The reset controller detects the host's reset pulse, issues a separate reset pulse to the other components of the modem, monitors the modem's clock and then terminates the separate reset pulse after a prescribed duration. The length of the waveform of the separate reset pulse is determined by a specific number of DSP clock cycles. This ensures that the minimum time required by the DSP for its reset is met.

In the preferred embodiment, the host is a PCMCIA system which issues a PCMCIA (external) pulse to the modem. The PCMCIA pulse is a positive asserted pulse. Upon detection of the rising edge of the positive asserted PCMCIA reset pulse, the reset controller issues a separate reset pulse to the DSP. The separate reset pulse can be inverted to be a negative asserted pulse by the ASIC or preferably by the reset controller itself. Then, after waiting a specified number of DSP clock cycles, the reset controller ends its pulse by releasing the reset. The advantage is that the minimum "reset" time required by the DSP to initialize certain critical registers is a known number of DSP clock cycles. Thus, the reset duration in the invention is precisely minimized to an extent not possible in the prior art.

The use of the DSP clock to obtain a minimum duration reset pulse is a substantial advance over the prior art. In the prior approach of shortening the reset pulse by adding external circuitry the DSP clock was not used to time the pulse because the clock could not be accessed by the added circuitry. As shown in the present invention, the most effective way to obtain the shortest possible modem reset/sleep operation requires the use of the DSP clock for timing and synchronization. That is, by knowing the minimum time needed by the DSP and by having access to the DSP clock, a minimum duration reset pulse can be issued to the DSP. Since the current invention does not use external circuitry, the invention does not have to extend its reset pulse, as was necessary with the prior art to account for variations in components values.

By issuing a separate reset pulse to the DSP, the present invention frees the DSP from being required to wait for completion of the potentially long PCMCIA reset pulse. The DSP can access the ASIC as soon as the DSP initialization is complete. The DSP can then configure the ASIC and place the modem into a sleep mode quickly. This allows the modem to comply with the PCMCIA standard and the requirements of the Berlin Power Compliance.

Although the reset controller can be placed in a variety of locations within the modem, in the present invention the reset controller is included in the ASIC. With the reset controller integrated within the ASIC, no additional external hardware is required to issue the shortened reset pulse.

The invention is embodied in a modem connected to an external controller. The modem includes a DSP having a reset terminal and a clock. The DSP begins performing a reset upon a first signal applied to its reset terminal and causes the modem to enter a sleep-mode after a second signal is applied to its reset terminal. The external controller is capable of transmitting an external signal. The reset controller in the modem has a counter and an output node.

The counter is connected to the clock and provides a counter output signal upon receipt of a predetermined number of cycles of the clock. The counter initiating generally concurrent with receipt of the external signal.

The output node is connected to the reset terminal of the DSP and to the output counter. The output node provides a first signal to the DSP generally concurrent with receipt of the external signal and a second signal generally concurrent with receipt of the counter output signal.

The predetermined number of cycles of the clock should be at least as long as the minimum time the DSP requires to perform a reset. Alternatively, the predetermined number of cycles can be at least the minimum time the DSP requires to perform a reset plus a predetermined margin of error.

The reset performed by the DSP at least involves the initialization of selected registers within the DSP. The reset can also include a confirmation of the reset signal.

Since the counter is connected to the clock, the counter can initialize in synchronization with the DSP clock. That is, the counter can initialize within a clock cycle after the counter first receives the external signal.

Likewise, the output node can be connected to receive the clock signal. By knowing the clock signal the output node can transmit the reset pulse to the DSP in synchronization with the DSP. As such, the output node will provide the first signal of the reset pulse to the DSP within a clock cycle after the output node first receives the external signal.

The modem may be connected to the external controller by way of an external bus which will carry the external reset signal from the bus controller to an application circuit of the modem. The application circuit would be connected directly to the external bus and to a DSP bus. The DSP bus would be positioned between the application circuit and the DSP, such that the DSP could carry signals between the application circuit and the DSP. The external reset signal can be a pulse waveform. The leading edge of the pulse waveform causing the DSP to initialize selected registers and the trailing edge allowing the DSP to begin running code which may, for example, place the modem to sleep.

The method of providing a shortened reset pulse utilizes the system described herein and includes the steps of asserting a reset signal to said DSP reset terminal generally concurrent with receipt of the external reset signal, and deasserting the reset signal upon completion of a predetermined number of clock cycles by said counter, after said asserting step.

DETAILED DESCRIPTION OF THE PREFERRED EMBODIMENTS

Figure 5:
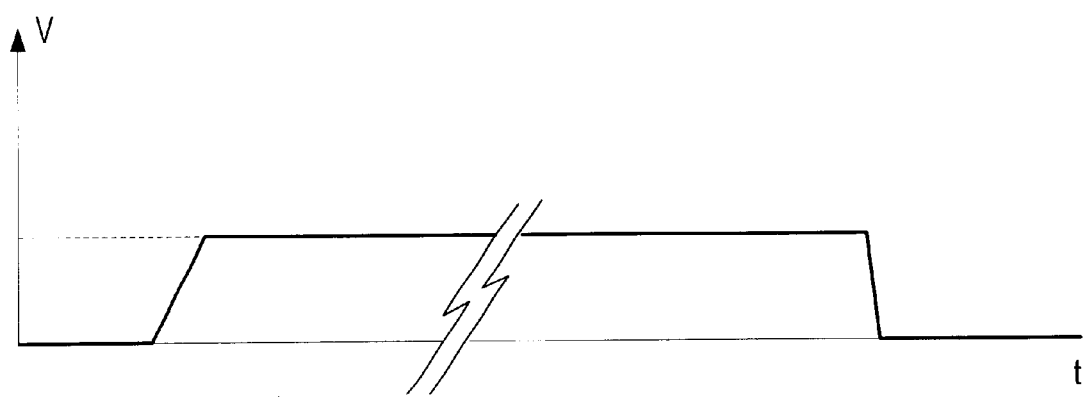
FIG. 5 is a graph showing the voltage of the external reset pulses time.

In the preferred embodiment the reset controller for issuing a shortened reset pulse upon receipt of an external reset pulse is a circuit incorporated into the ASIC of the modem. The modem is attached to a PCMCIA bus which is controlled by a PCMCIA controller. The PCMCIA controller issues the external (PCMCIA) reset pulse to the modem. The PCMCIA reset pulse is a positive asserted pulse. An Example of a positive asserted pulse waveform is shown in FIG. 5. Upon detection of the PCMCIA reset pulse, the reset controller issues a separate DSP reset pulse to the DSP. The reset pulse is inverted by the reset controller to be a negative asserted pulse (in an alternative embodiment the inversion can be carried out by the ASIC). In the preferred embodiment the duration of the DSP pulse is precisely minimized to be only as long as the minimum pulse require by the DSP.

This minimum DSP pulse duration allows the modem to comply with the PCMCIA standard which requires that within the first second which power is applied to the PC Card the current does not exceed an average of 100 milli-Amps for a 5 volt system and 70 milli-Amps for a 3 volt system.

Figure 6:
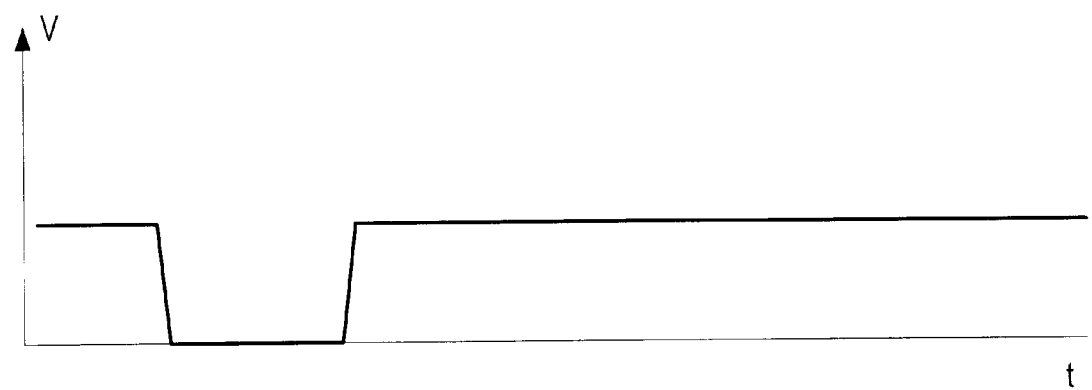
FIG. 6 is a graph showing the voltage of a shortened reset pulse verses time.

The minimum duration of the DSP reset pulse is that necessary to allow the DSP to confirm receipt of the pulse (to determine that the pulse is not just a glitch) and to complete the reset by initializing the contents of certain critical registers. The shape of the DSP reset pulse is also critical. The DSP requires a negative asserted reset pulse. Such a pulse is a high, low, high pulse. An example of a negative asserted reset pulse is shown in FIG. 6.

Under the PCMCIA standard the reset pulse asserted by the PCMCIA controller can range in duration from a minimum of ten micro-seconds to upwards of several seconds in length. The potential extreme relative length of the PCMCIA reset pulse prohibits its direct use by the DSP. In fact, if the DSP attempted to use a long PCMCIA pulse to reset itself, the modem would most likely fail to enter the sleep mode within the time required by the PCMCIA specification. Further, the shape of the PCMCIA reset pulse is incompatible with the DSP requirements. The shape of the PCMCIA positive asserted reset pulse (low-high-low) is the opposite of the DSP requirement for a negative reset pulse (high-low-high).

If the DSP reset pulse lacks the proper duration or shape, then the DSP will fail to operate properly.

Description of the Modem Components

Figure 1:
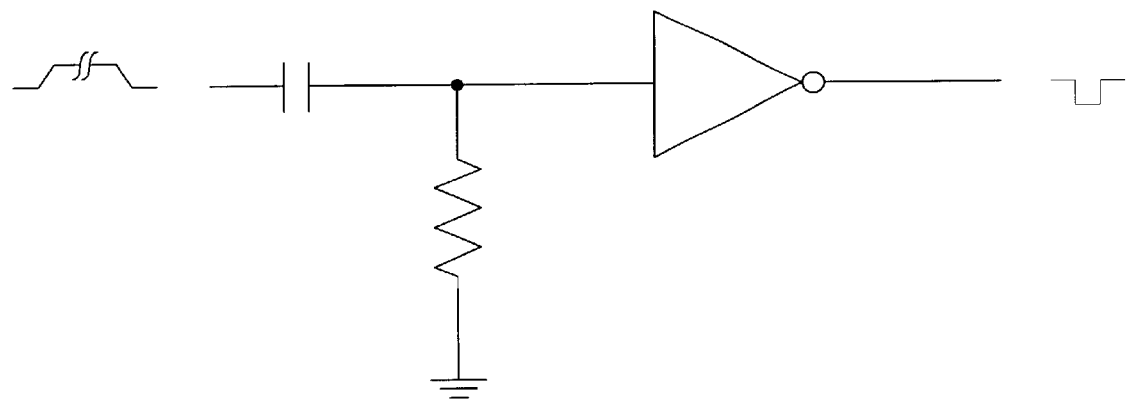
FIG. 1 is a schematic of the prior art circuitry used to convert the external reset pulse into a shortened DSP pulse.
Figure 2:
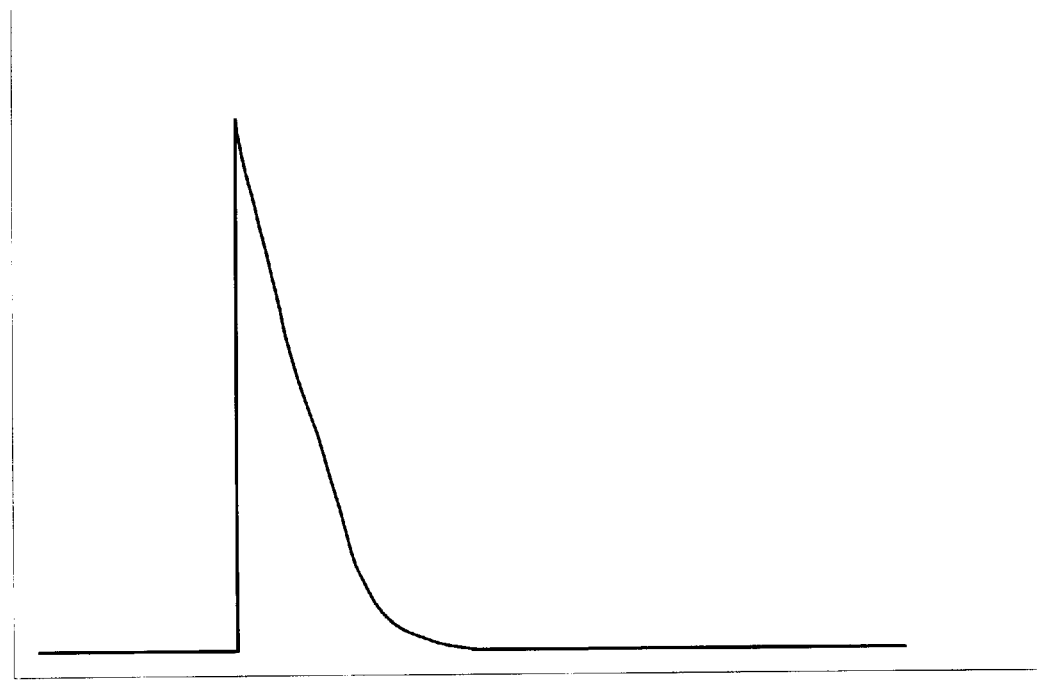
FIG. 2 is a graph showing the voltage of the shortened reset pulse produced by the prior art circuitry verses time.
Figure 3:
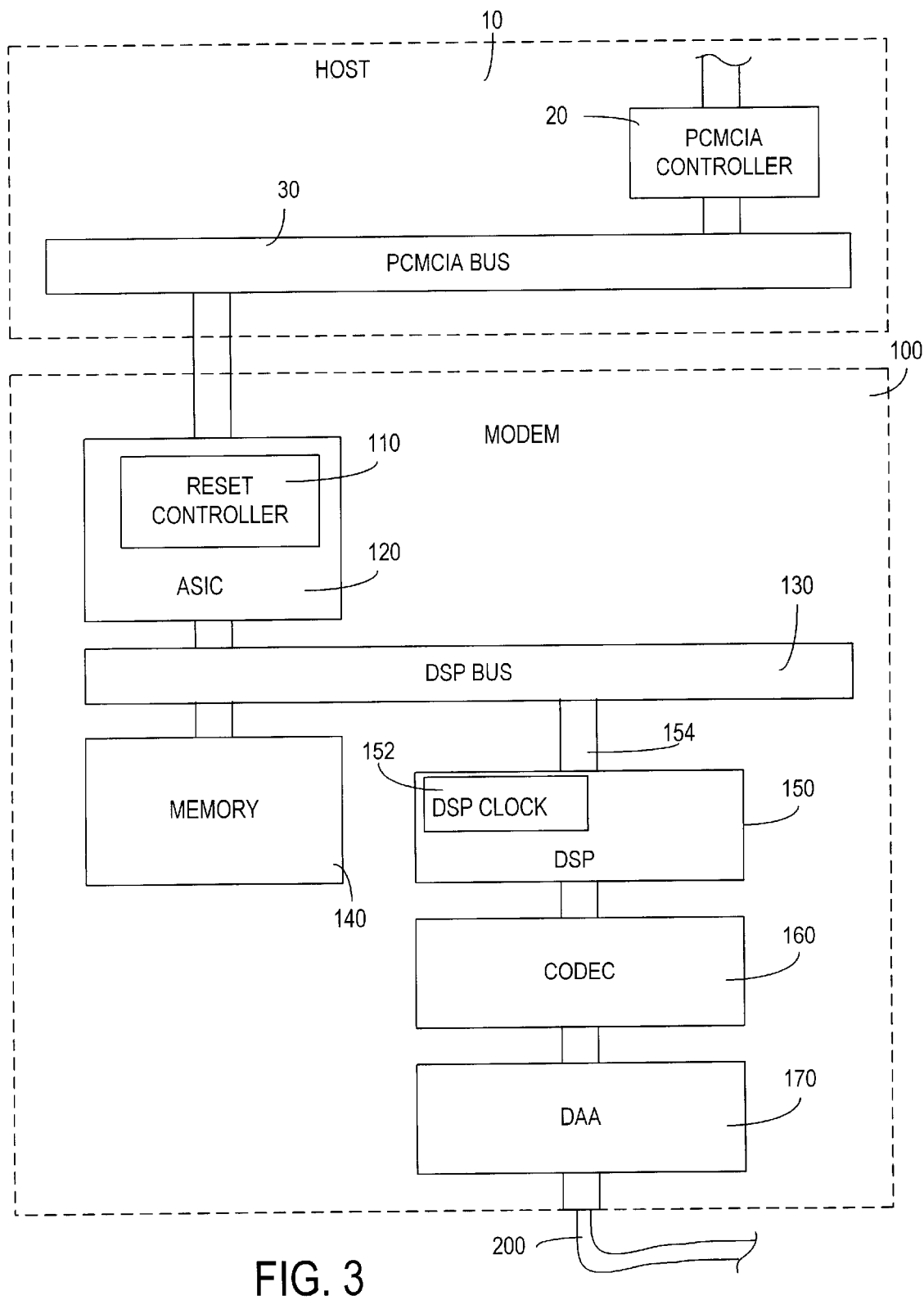
FIG. 3 is a schematic of the relevant modem and host components including the reset controller for issuing a shortened reset pulse upon receipt of an external reset pulse.

FIG. 3 shows the arrangement of components for a typical modem (modulator-demodulator) 100 in which a reset controller for issuing a shortened reset pulse upon receipt of an external reset pulse 110, can be incorporated into. The modem comprises the following primary components: an ASIC 120, a DSP bus 130, a memory 140, a DSP 150, a CODEC 160, and a DAA Device 170. Also shown in FIG. 3 is a portion of a host 10, including a PCMCIA controller 20 and a PCMCIA bus 30, as well as a telephone line 200 which is attached to the modem 100.

The modem 100 is a device that enables the host to transmit and receive data over telephone lines. A modem is necessary for the host 10 to communicate to outside devices. Because data in a host such as a computer is stored and internally transmitted digitally, and telephone lines can only transmit data in an analog form, a modem is necessary to convert between these two forms of data. Thus, the modem 100 allows the host 10 to communicate with an outside host, network or other similar system over a telephone line.

The ASIC 120 is an application specific integrated circuit (ASIC). Typically the ASIC 120 is in the form of a microchip specifically designed for its particular application within the modem 100. One function of the ASIC can be to provide an universal asynchronous receiver-transmitter (UART). An UART handles asynchronous serial communication, converting data between a parallel format and a serial format for transmission over telephone phone lines. The ASIC 120 can function to invert the PCMCIA reset pulse form a positive asserted pulse to a negative asserted pulse, so as to conform to the waveform shape requirements of the DSP. In the preferred embodiment this inversion is performed by the reset controller as described below.

With the modem 100 attached to the host 10, the ASIC 120 is connected directly to the PCMCIA bus 30. The ASIC 120 can receive and transmit data directly with the PCMCIA bus 30. The ASIC 120 is also attached to the DSP bus 130 such that the DSP can read from and write to the ASIC via the DSP bus 130. As such, the ASIC 120 is positioned directly between the PCMCIA bus 30 and the DSP bus 130. This positioning allows the ASIC 120 to control the transfer of data between the PCMCIA bus 30 and the DSP bus 130. Also, so connected the ASIC 120 can receive a clock signal from the DSP clock 152 via the DSP bus 130. To operate properly the ASIC 120 can only receive a certain maximum clock rate from the DSP clock 152.

With the reset controller 110 positioned within the ASIC, the reset controller 110 can accept the host's PCMCIA reset pulse and issue a shortened reset pulse to the DSP 150 (via the DSP bus 130). The shortened reset pulse is one which will cause an early reset of the modem 100 and which will cause the modem 100 to quickly enter a sleep mode. The operation of the ASIC 120 is controlled by the DSP 150. The specific structure and the operation of the reset controller 110, including its assertion of a shortened reset pulse upon receipt of the host's PCMCIA reset pulse, is further detailed herein.

The DSP bus 130 has attached to it the ASIC 120, the memory 140 and the DSP 150. In this manner, the DSP bus 130 is directly connected to each of these components of the modem 100, as shown in FIG. 3. In the preferred embodiment the DSP bus 130 is a 16 bit bus.

The memory 140 is mounted to the DSP bus 130 and is used by the DSP to store data and/or program instructions for use by the DSP 150. The memory 140 can be flash or non-volatile memory.

The DSP 150 is a digital signal processor (DSP), which is designed specifically for performing the operations necessary for digital signal processing. The digital signal processing performed by the DSP 150 involves manipulating data being sent from or received by the modem 100. The DSP 150 also controls the operation of the other components of the modem 100. In the preferred embodiment the DSP 150 is programmable. Also attached to the DSP 150 is the CODEC (coder/decoder) 160. With the DSP 150 positioned between the DSP bus 30 and the CODEC 160, the DSP 150 can operate to process data traveling from the DSP bus 130 to the CODEC 160, or from the CODEC 160 to the DSP bus 130. Among other items, the DSP 150 contains a DSP clock 152 which provides a clock signal to the ASIC 120, a DSP reset terminal 154. The DSP reset terminal 154 is connected to the DSP bus 130 and receives the DSP reset signal issued by the reset controller 110 through the ASIC 120 and DSP bus 130. The DSP 150 can have on board read only memory (ROM).

The DSP 150 controls both the reset and sleep of the modem 100. In the preferred embodiment the DSP 150 requires a reset pulse which has a high-low-high waveform. This type of wave form is called a negative asserted reset and an example is shown in FIG. 6. This reset pulse is received by the DSP 150 through the DSP reset terminal 154. The DSP 150 also requires that the reset pulse it receives be at least a specific duration. This minimum duration is a combination of the time needed to confirm the reset signal is genuine and to carry out the reset.

When a reset pulse is received by the DSP 150, through the DSP reset terminal 154, the DSP 150 initially checks to determine that the reset pulse is genuine. This done by confirming that the reset pulse is longer than a certain preset minimum. This confirmation is done to avoid having a glitch or other errant signal cause a reset of the modem 100. Typically, the confirmation check allows only those signals which are at least 2–3 clock cycles in duration through as genuine reset pulses.

In carrying out the reset the DSP initializes critical registers, such as the instruction pointer. This initialization requires a certain minimum amount of time. As such, the duration of the reset pulse received by the DSP can be shortened only to the minimum time need to carry out the confirmation and initialization operations. This minimum time is a known number of DSP clock cycles (e.g., 8–10 DSP clock cycles).

A sufficiently long reset is critical to the operation of the DSP 150, because without it the DSP 150 cannot properly begin its operations. Once the DSP 150 finishes its reset, it will be set at a specific known point in the code and be ready to begin instructing the modem 100 to enter a sleep mode.

The DSP 150 will not begin to place the modem 100 into a sleep mode until the reset pulse has concluded. Therefore, to finish both the reset and to get the modem into a sleep mode as quickly as possible, not only does the reset pulse have to be at least of certain minimum duration, but the pulse must also conclude immediately, or at least shortly, after the DSP 150 completes the reset operation. This is because the DSP 150 will only start execution of the code to put the modem 100 to sleep when the DSP 150 receives the trailing edge of the reset pulse.

DSP chips are produced by many different manufacturers including Texas Instruments Inc., Analog Devices, Inc., Lucent Technologies Inc. and Rockwell International Inc.

The CODEC 160 operates to convert the digital signals coming from the host 10 to analog signals which can be transmitted over the telephone line 200. As can be seen in FIG. 3, the CODEC 160 is positioned between the DSP 150 and the data access arrangement device (DAA) 170. In this way the CODEC 160 can convert the outgoing processed digital signals sent from the DSP 150 into analog signals which can be utilized by the DAA 170 for transmission over the telephone line 200. Likewise, the CODEC 160 can convert the incoming analog signals received from the telephone line 200 and into digital signals which can be processed by the DSP 150 for use by the host 10.

The DAA 170 is the last component of the modem 100 to handle the outgoing data before it reaches the telephone line 200. Likewise, the DAA 170 is the first component of modem 100 to receive incoming data from telephone line 200. As shown in FIG. 3, the DAA 170 is connected between the CODEC 160 and the telephone line 200. The DAA is a completely analog device containing circuitry which controls the effect the modem has on the telephone line 200. The DAA 170 operates to limit current draw from the telephone line 200 and provides a prescribed amount of impedance to the telephone line 200.

Description of the Relevant Components of the Host

The relevant portion of the host 10, include the PCMCIA controller 20 and the PCMCIA bus 30. These components are shown in FIG. 3.

The PCMCIA controller 20 controls management of the devices attached to the PCMCIA bus 30. The PCMCIA controller 20 assigns addresses to devices and coordinates communication between the host 10 and devices attached to the PCMCIA bus 30. Some of the operations of the PCMCIA controller 20 include requesting and then using software needed to properly communicate with an attached device, querying devices for information, writing to devices, allowing sufficient time for sequencing operations of devices, and the like. The PCMCIA controller 20 also asserts a reset pulse (the PCMCIA reset pulse). The shape of the waveform of the PCMCIA reset pulse is low-high-low, as shown in FIG. 5. Under the PCMCIA standard this reset pulse can have a duration between a minimum of 10 micro-seconds and as long as several seconds. Because the PCMCIA reset pulse has the wrong shape and a relatively long duration, it cannot be directly used to reset the DSP 150 in order to cause the modem 100 enter a sleep mode quickly enough to meet the PCMCIA standard and to conserve power.

The PCMCIA bus 30 as seen in FIG. 3 is attached to the PCMCIA controller 20. With the modem 100 connected to the PCMCIA bus 30, the PCMCIA bus 30 is positioned between the PCMCIA controller 20 and the ASIC 120. The PCMCIA bus 30 operates to transmit data between the host 10 and any device attached to the host 10. The PCMCIA bus 30 can receive PCMCIA compliant devices other than just the modem 100. The PCMCIA bus 30 contains one line for transmitting the PCMCIA reset pulse.

Description of the Preferred Embodiment of the Present Invention

The reset pulse issued by the reset controller 110 to the DSP 150 causes an early completion of the modem 100 reset, such that the modem 100 will enter a sleep mode soon after the PCMCIA reset pulse is asserted by the host. The preferred embodiment of the present invention can be seen in both FIGS. 3 and 4.

In FIG. 3 the reset controller 110 can be seen in its preferred location as a component of the ASIC 120. Unlike the prior approach of adding external circuitry in order to conform to the PCMCIA specification, it is preferred that the present invention is implemented as circuitry within the ASIC. That is, it is preferred that the reset controller 110 be a component of ASIC 120, so that the reset controller 110 can directly receive the PCMCIA reset pulse and issue a shortened reset pulse to the DSP 150. With the reset controller 110 within the ASIC, costs can be reduced by eliminating the need for any extra hardware. Also, with the reset controller 110 incorporated into the ASIC 120 no additional board space is used. Since it is relatively easy to produce modifications of an ASIC chip, the integration of the reset controller 110 into the ASIC 120 is the simplest and most cost effective way to make the modem 100 comply with the PCMCIA standard, by being able to have an early reset and quickly enter a sleep mode.

Based on a maximum clock rate of the DSP clock 152, after the PCMCIA reset pulse is detected, the reset controller 110, through the ASIC 120, issues a synchronized reset pulse to DSP 150 and then counts the correct number of DSP clock cycles before releasing the reset pulse in synchronization with the DSP. This provides the minimum required reset pulse to the DSP 150. The minimum number of clock cycles used to determine the length of the reset pulse issued to the DSP will be a sum of the known minimum reset required by the DSP 150 plus some reasonable margin of error. This margin is typically far less than the margin that must be provided with the prior art RC circuit. As noted, the prior art RC circuit required a relatively large margin of error to account for the inherent variations in the circuit's component values. Therefore, the reset pulse in the present invention can be minimized to a degree not previously possible. This, of course, is a significant advantage.

Figure 4:
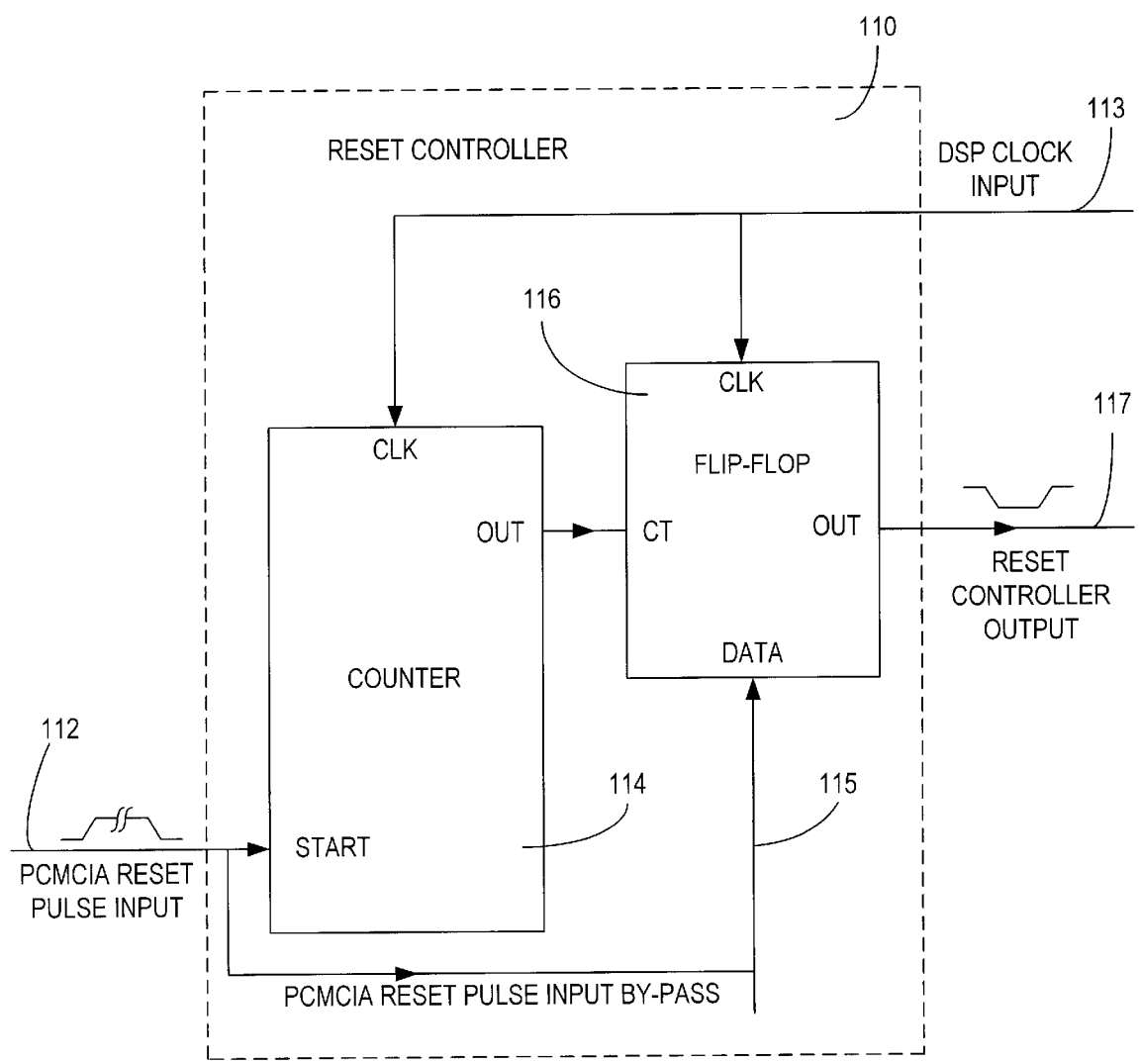
FIG. 4 is a schematic of the reset controller for issuing a shortened reset pulse upon receipt of an external reset pulse.

FIG. 4 shows the preferred implementation of the present reset controller 110. The reset controller 110 has the following components: a PCMCIA reset pulse input 112, a DSP clock input 113, a counter 114, a PCMCIA reset pulse input by-pass 115, a flip-flop 116 and a reset controller output 117.

The PCMCIA reset pulse input 112 carries the PCMCIA reset pulse from the PCMCIA controller 20 (transmitted via the PCMCIA bus 30) to the counter 114.

The DSP clock input 113 carries the clock signal from the DSP clock 152 into the counter 114 and into the flip-flop 116. The DSP clock 152 signal is inputted into counter 114 and the flip-flop 116 so that the output of each is synchronized with the DSP. Further, the counter 114 uses the signal of the DSP clock 152 as a time counter for its operation.

The counter 114 operates such that when the PCMCIA reset pulse is received via the PCMCIA reset pulse input 112, the counter 114 uses the DSP clock signal to begin counting up to a predetermined number of counts.

The initiating of the counter 114 occurs generally concurrent with the receipt of the external reset pulse by the reset controller 110. It is preferred to allow for synchronization that the initiating occurs within one clock cycle of the receipt of the external reset pulse by the reset controller 110. In alternative embodiments of the invention the initiating of the counter 114 can occur within a multitude of clock cycles after receipt of the PCMCIA reset pulse. The number of clock cycles can be dependant upon factors such as the need for a margin of safety, the speed of the clock, and/or the designer's preference.

The predetermined number of counts for counter 114 is selected based upon the reset requirements of the specific DSP chip used. The preferred Texas Instruments Inc. DSP chip has a minimum reset requirement of 8 clock cycles with a margin of plus or minus 3 to 3.5 clock cycles. Thus, it is preferred that the count duration be 12 clock cycles (8 plus at least 4 cycles to cover the margin).

In alternative embodiments of the invention, the predetermined number of clock cycles can be any amount greater than the minimum time the DSP 150 requires to perform a reset, which still allows for compliance with the PCMCIA standard for quick completion of the reset/sleep operation. The exact amount number of clock cycles can depend on many factors such as those affecting the counter initiation.

When the predetermined count is reached, the counter 114 issues a counter output signal to the flip-flop 116 to end the reset pulse being sent to the DSP 150 by the flip-flop 116. As such, the duration of the reset pulse issued by the reset controller 110 to the DSP 150, will be equal to the duration of the count of the counter 114.

The PCMCIA reset pulse input by-pass 115 is a connection between the PCMCIA reset pulse input 112 and the flip-flop 116. The by-pass 115 operates to carry the leading edge of the PCMCIA reset pulse to the flip-flop 116.

In the preferred embodiment, the output node is a flip-flop circuit. The flip-flop 116 operates to issue a reset pulse generally concurrent with receipt of the PCMCIA pulse by the flip-flop 1116. The reset pulse issued by flip-flop 116 is of a duration and shape required by the DSP 150. This is done by starting the DSP reset pulse upon the first clock cycle after the flip-flop 116 receives the leading edge of the PCMCIA reset pulse from the PCMCIA reset pulse input by-pass 115. Thus, to within one DSP clock cycle, the leading edge of the DSP reset pulse is generally concurrent with the leading edge of the PCMCIA reset pulse.

In alternative embodiments of the invention the flip-flop 116 can issue the reset pulse within a multitude of clock cycles after receipt of the PCMCIA reset pulse. As with initiating the counter 114 and determining the predetermined number of clock cycles, the determination of exact number of clock cycles before asserting the shortened reset signal can be dependant on a variety of factors.

The flip-flop 116 continues sending the DSP reset pulse to the DSP 150, until it receives a later signal from the counter 114, at which time the flip-flop 116 releases the pulse, providing a trailing edge to the pulse. In this manner, the reset pulse sent to the DSP 150 differs from the PCMCIA reset pulse in that the pulse is of the minimum duration necessary for achieving an early reset of the modem 100 and causing it to enter a sleep mode quickly. By issuing a low-high-low output signal, the flip-flop 116 provides a pulse to the DSP which is the inverse of the PCMCIA reset pulse. That is, the flip-flop 116 issues a negative asserted reset pulse to the DSP, upon receipt of the positive asserted pulse of the PCMCIA reset pulse.

The flip-flop 116 also receives an input from the DSP clock 152 via the DSP clock input 113 to synchronize it with the DSP. The synchronization is necessary because although the output from the counter 114 will be synchronized with the DSP (it has the DSP clock input 113), the PCMCIA reset pulse (issued by the PCMCIA controller) may not be synchronized with the DSP 150. If the PCMCIA reset pulse is received when the DSP clock 152 signal is high then the PCMCIA reset pulse will be synchronized with the DSP clock 152 and no delay for synchronization will occur.

The reset controller output 117 carries the reset pulse from the flip-flop 116 to the DSP 150 (via the DSP bus 130).

The method of providing a shortened reset pulse in a modem connected between an external controller and an analog port, utilizes the preferred system described herein and includes the steps of asserting a reset signal to said DSP reset terminal generally concurrent with receipt of the external reset signal, and deasserting the reset signal upon completion of a predetermined number of clock cycles by said counter, after said asserting step.

Figure 7:
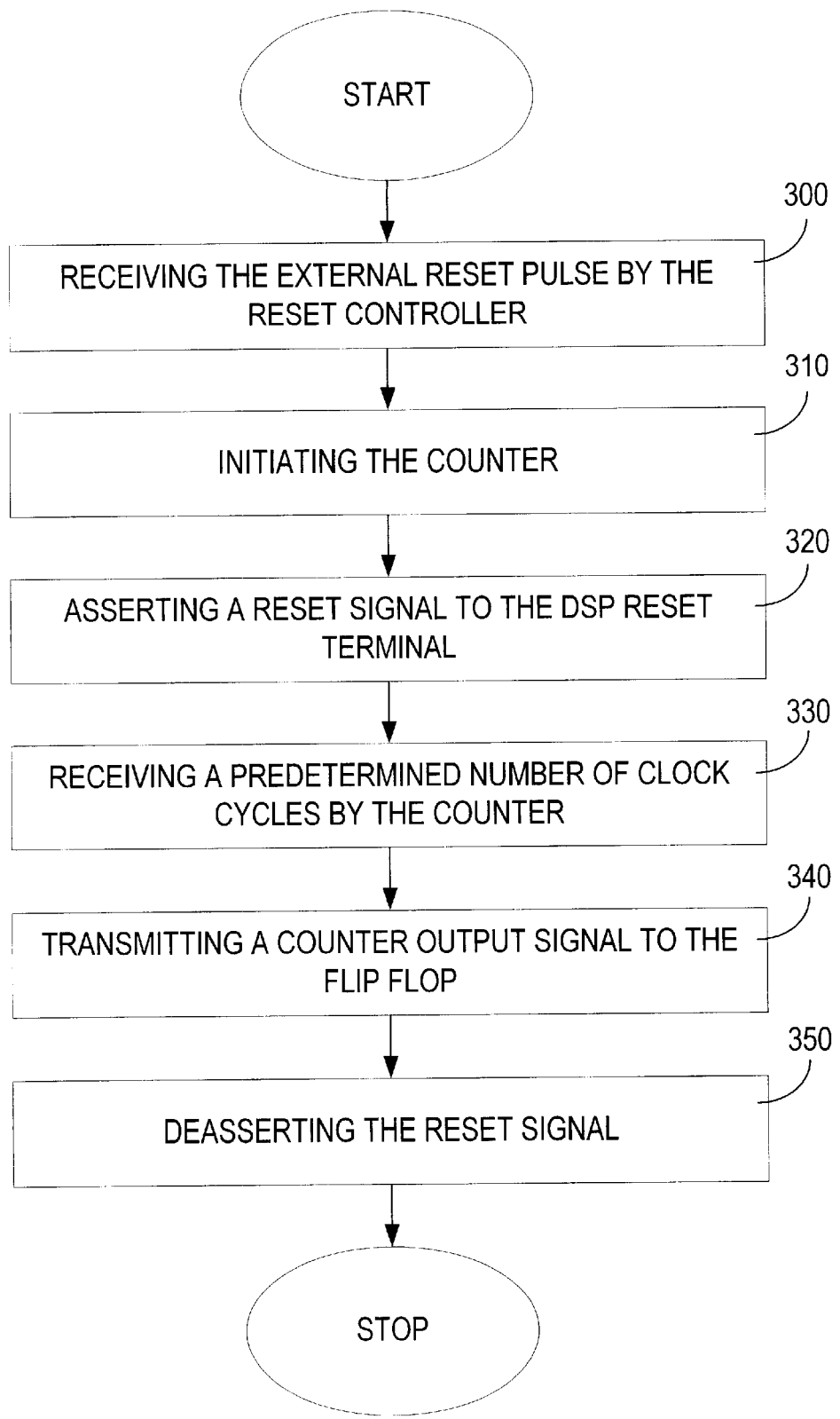
FIG. 7 is a flow chart showing the step of the method for providing a shortened reset pulse upon receipt of an external reset pulse.

The preferred method of providing a shortened reset signal includes the steps of receiving the external reset pulse 300, initiating the counter 310, asserting a reset signal to the DSP reset terminal 320, receiving a predetermined number of clock cycles 330, transmitting a counter output signal to the flip-flop 340, and deasserting the reset signal 350. The preferred method can be seen in FIG. 7.

The step of receiving the external reset pulse 300 involves the reset controller 110 receiving from the PCMCIA controller 20 the external reset pulse. The external reset pulse is transmitted by the PCMCIA controller 20 over the PCMCIA bus 30. The external reset pulse is a positive asserted pulse which under the PCMCIA standard can range from a minimum of 10 micro-seconds upwards to several seconds in duration. As shown in FIG. 4 the PCMCIA reset pulse is received by reset controller 110 on the PCMCIA reset pulse input 112. The PCMCIA pulse is transmitted to the counter 114 (via its start input) and through the PCMCIA reset pulse input by-pass 115 to the flip-flop 116 (via its data input).

The step of initiating of the counter 310 is performed generally concurrent with receipt of the PCMCIA reset pulse by the reset controller 110. It is preferred that the initiating of the counter 114 by the reset controller 110 occurs within one clock cycle of the receipt of the PCMCIA reset pulse by the counter 114.

In alternative embodiments of the invention the initiating of the counter 114 can occur within a multitude of clock cycles after receipt of the PCMCIA reset pulse. The number of clock cycles can be dependant upon factors such as the need for a margin of safety, the speed of the clock, and/or the designer's preference.

The step of initiation of the counter can occur substantially at the same time as the step of asserting the DSP reset signal 320.

The step of asserting the DSP reset signal to the DSP reset terminal 320 involves the assertion of a shortened reset signal by the reset controller 110 to the DSP 150 via the DSP bus 130. The shortened reset signal is received by the DSP 150 through the DSP reset terminal 154. The assertion of the shortened reset pulse occurs generally concurrent with receipt of the PCMCIA reset pulse by reset controller 110. It is preferred that the assertion of the shortened reset pulse occurs within one clock cycle of the receipt of the PCMCIA reset pulse by the flip-flop 116 (via the PCMCIA reset pulse input by-pass 115).

In alternative embodiments of the invention the asserting of the shortened reset pulse can occur within a multitude of clock cycles after receipt of the PCMCIA reset pulse. As with the initiating of the counter, the exact number of clock cycles before asserting the shortened reset signal can be dependant on a variety of factors.

The step of asserting the shortened reset pulse 320 can occur substantially at the same time as the step of initiation of the counter 310. It is preferred that the shortened reset pulse be a negative assert pulse waveform. That is, that the shorten pulse be of a high-low-high configuration. As such, the assertion of the shortened reset pulse would include the issuance of a leading edge of a negative asserted pulse. Upon receipt of the leading edge of the shortened reset pulse the DSP 150 will begin performing a signal confirmation and its initialization of registers.

The step of receiving a predetermined number of clock cycles 330 involves the receipt by the counter 114 of a predetermined number of clock cycles from the DSP clock input 113. The counter 114 being connected to the DSP clock 152 via the DSP clock input 113 such that the counter 114 receives the DSP clock signal via the clock input of counter 114. This is shown in FIG. 4. The predetermined number of clock cycles of from the DSP clock 152 is at least the minimum time the DSP 150 requires to perform a reset. It is preferred that the predetermined number of clock cycles is at least the minimum time the DSP 150 requires to perform a reset plus a predetermined margin of error. The reset which the DSP 150 performs involves the confirmation of receipt of the reset signal and initialization of selected registers.

In alternative embodiments of the invention the predetermined number of clock cycles can be any amount greater than the minimum time the DSP 150 requires to perform a reset, which still allows for compliance with the PCMCIA standard for quick completion of the reset/sleep operation. The exact amount number of clock cycles can depend on many factors such as the need for a margin of safety, the speed of the clock, and/or the designer's preference.

The step of transmitting a counter output signal to the flip-flop 340 involves the counter 114 sending via its out node the counter output signal to the flip-flop 116. The flip-flop 116 receives the counter output signal on its count input. The connection between the counter 114 and the flip-flop 116 is shown in FIG. 4. The counter output signal is provided by the counter 114 upon receipt by counter 114 of the predetermined number of cycles of the DSP clock 152. When the counter output signal is received by the flip-flop 116 the step of deasserting the reset signal 350 is initiated.

The step of deasserting the reset signal 350 involves termination of the shortened reset signal sent to the DSP 150 by reset controller 110. The termination occurs when the counter 114 reaches the predetermined number of DSP clock cycles and issues to the flip-flop 116 the output counter signal. It is preferred that the deassertion of the reset signal by the reset controller 110 includes the issuance by the flip-flop 116 of a trailing edge of the negative asserted pulse waveform originally issued by the reset controller 110 during the step of asserting the DSP reset signal 320. Upon receipt of the trailing edge of the shortened reset pulse the DSP 150 will begin executing code to place the modem into a sleep mode.

While the invention has been described in detail by specific reference to preferred embodiments, it is understood that variations and modifications thereof may be made without departing from the true spirit and scope of the invention.

What is claimed is:

1. In a modem connected to an external controller, said modem comprising a DSP having a reset terminal and an internal clock, whereby said DSP begins performing a reset upon a first signal applied to said reset terminal and causes said modem to enter a sleep-mode after a second signal is applied to said reset terminal, said external controller being capable of transmitting an external signal, a reset controller in said modem comprising:
- a counter connected to said DSP internal clock and providing a counter output signal upon receipt of a predetermined number of cycles of said DSP internal clock, said counter initiating generally concurrent with receipt of the external signal; and
- an output node connected to said reset terminal of said DSP and to said output counter, said output node providing said first signal to said DSP generally concurrent with receipt of the external signal and said second signal generally concurrent with receipt of the counter output signal.

2. The reset controller of claim 1, wherein the predetermined number of cycles of said DSP internal clock is at least the minimum time said DSP requires to perform a reset.

3. The reset controller of claim 1, wherein the predetermined number of cycles of said DSP internal clock is at least the minimum time said DSP requires to perform a reset plus a minimum margin of error.

4. The reset controller of claim 3, wherein the reset performed by said DSP is the initialization of selected registers.

5. The reset controller of claim 4, wherein the reset performed by,said DSP further comprises a confirmation of said reset controller.

6. The reset controller of claim 1, wherein said counter initializes within one DSP internal clock cycle after receipt of the external signal.

7. The reset controller of claim 6, wherein said output node is further connected to said DSP internal clock, wherein said output node provides the first signal to said DSP within one clock cycle after receipt of the external signal.

8. In a modem connected to an external bus, said external bus being controlled by a bus controller, said modem comprising an application circuit connected directly to said external bus, a DSP having a reset terminal and a DSP internal clock whereby said DSP initializes selected registers therein upon a leading edge of a reset pulse applied to said reset terminal and said DSP causes said modem to enter a sleep-mode after the trailing edge of a reset pulse applied to said reset terminal, said DSP and said application circuit connected to said DSP bus, said external bus controller being capable of transmitting on said external bus an external reset pulse of a first duration, a reset controller circuit in said modem comprising:
- a counter connected to said DSP internal clock and providing a counter output signal upon receipt of a predetermined number of cycles of said DSP internal clock, said counter initiating generally concurrent with receipt of the leading edge of said external reset pulse; and
- a pulse output node connected to said reset terminal of said DSP and to said output counter, said output node providing a leading DSP reset pulse edge generally concurrent with the leading edge of said external reset pulse and a trailing DSP pulse edge generally concurrent with said counter output signal, so as to provide a reset pulse to said DSP having a duration generally corresponding to said predetermined number of DSP internal clock cycles.

9. The reset controller of claim 8, wherein the predetermined number of cycles of said DSP internal clock is at least the minimum time said DSP requires to initialize selected registers.

10. The reset controller of claim 8, wherein the predetermined number of cycles of said DSP internal clock is at least the minimum time said DSP requires to confirm receipt of the DSP reset pulse and to initialize selected registers.

11. The reset controller of claim 8, wherein the predetermined number of cycles of said DSP internal clock is at least the minimum time said DSP requires to confirm receipt of the DSP reset pulse and to initialize selected registers plus a predetermined margin of error.

12. The reset controller of claim 11, wherein said counter initializes within one DSP internal clock cycle of receipt of the external reset pulse.

13. The reset controller of claim 12, wherein said pulse output node is further connected to said DSP internal clock, wherein said pulse output node provides the leading DSP reset pulse edge to said DSP within one DSP internal clock cycle of the external reset pulse.

14. The reset controller of claim 13, wherein said pulse output node comprises a flip-flop circuit having a first input of the output counter signal, a second input of the external reset pulse, a clock input of the DSP internal clock signal and an output to said DSP reset terminal.

15. In a modem providing a modulator/demodulator function connected between an external bus controlled by an external controller and an analog port, said modem comprising a DSP having a reset terminal and a DSP internal clock, whereby said DSP begins performing a reset upon a signal applied to said reset terminal and causes said modem to enter a sleep-mode after the signal is terminated, said external controller being capable of transmitting an external signal, a method for providing a shortened reset signal to said DSP reset terminal, comprising the steps of:

asserting a reset signal to said DSP reset terminal generally concurrently with receipt of the external reset signal, and deasserting the reset signal upon completion of a predetermined number of clock cycles of said DSP internal clock, after said asserting step.

16. The method of claim 15, wherein asserting the reset to said DSP reset terminal occurs within one DSP internal clock cycle of receipt of the external reset signal.

17. The method of claim 15, wherein the predetermined number of clock cycles is at least the minimum time said DSP requires to perform a reset.

18. The method of claim 15, wherein the predetermined number of clock cycles is at least the minimum time said DSP requires to perform a reset plus a predetermined margin of error.

19. The method of claim 18, wherein the reset performed by said DSP is initializing selected registers.

20. The method of claim 19, wherein the reset performed by said DSP further comprises confirming the reset signal.

21. The method of claim 15, wherein the asserting of the reset signal to said DSP reset terminal comprises issuing a leading edge of a pulse waveform.

22. The method of claim 21, wherein the deasserting of the reset signal comprising issuing a trailing edge of the pulse waveform.

23. The method of claim 22, wherein said pulse waveform is a negative asserted pulse.

* * * * *